US010679570B2

(12) United States Patent
Lien et al.

(10) Patent No.: US 10,679,570 B2
(45) Date of Patent: Jun. 9, 2020

(54) POWER SUPPLY MODULE OF DRIVING DEVICE IN DISPLAY SYSTEM, RELATED DRIVING DEVICE AND POWER SUPPLY METHOD

(71) Applicant: Sitronix Technology Corp., Hsinchu County (TW)

(72) Inventors: Cheng-Chieh Lien, Hsinchu County (TW); Kai-Yi Wu, Hsinchu County (TW)

(73) Assignee: Sitronix Technology Corp., Hsinchu County (TW)

(*) Notice: Subject to any disclaimer, the term of this patent is extended or adjusted under 35 U.S.C. 154(b) by 0 days.

(21) Appl. No.: 15/206,304

(22) Filed: Jul. 10, 2016

(65) Prior Publication Data
US 2017/0084230 A1    Mar. 23, 2017

Related U.S. Application Data

(60) Provisional application No. 62/222,227, filed on Sep. 23, 2015.

(51) Int. Cl.
*G09G 3/34*       (2006.01)
*G06F 1/3234*     (2019.01)

(52) U.S. Cl.
CPC .......... *G09G 3/344* (2013.01); *G06F 1/3265* (2013.01); *G09G 2310/0254* (2013.01); *G09G 2310/0275* (2013.01); *G09G 2330/028* (2013.01); *Y02D 10/153* (2018.01)

(58) Field of Classification Search
CPC .. G06F 1/26; G09G 3/344; G09G 2310/0254; G09G 2310/0275; G09G 2330/028
See application file for complete search history.

(56) References Cited

U.S. PATENT DOCUMENTS

| | | | |
|---|---|---|---|
| 8,957,887 B2* | 2/2015 | Kim | G09G 3/344 345/204 |
| 2005/0195149 A1* | 9/2005 | Ito | H02M 3/07 345/98 |
| 2006/0139309 A1* | 6/2006 | Miyasaka | G09G 3/344 345/107 |
| 2006/0145995 A1* | 7/2006 | Kim | G09G 3/3655 345/98 |

(Continued)

FOREIGN PATENT DOCUMENTS

| | | |
|---|---|---|
| CN | 1979624 A | 6/2007 |
| CN | 101529724 A | 9/2009 |

(Continued)

*Primary Examiner* — Stacy Khoo
(74) *Attorney, Agent, or Firm* — Winston Hsu

(57) ABSTRACT

A power supply module for a driving device of a display system includes a source power unit, for outputting a source high voltage only in a first period and outputting a source low voltage only in a second period according to a power control signal, wherein the source high voltage and the source low voltage are utilized for generating a plurality of data signals of a plurality of pixels in the display system; and a bias power unit, for generating a common voltage, wherein the common voltage is between the source high voltage and the source low voltage; wherein the first period does not overlap the second period.

9 Claims, 9 Drawing Sheets

(56) References Cited

U.S. PATENT DOCUMENTS

| | | | |
|---|---|---|---|
| 2006/0209011 A1* | 9/2006 | Miyasaka | G09G 3/344 345/107 |
| 2008/0238900 A1* | 10/2008 | Saito | G09G 3/344 345/204 |
| 2009/0189848 A1* | 7/2009 | Maeda | G09G 3/344 345/107 |
| 2010/0001942 A1 | 1/2010 | Lin | |
| 2010/0013818 A1* | 1/2010 | Akai | G09G 3/3651 345/212 |
| 2013/0135282 A1* | 5/2013 | Jeon | G09G 3/3696 345/212 |

FOREIGN PATENT DOCUMENTS

| | | | |
|---|---|---|---|
| CN | 101877216 A | | 11/2010 |
| CN | 102867485 A | | 1/2013 |
| CN | 202749073 U | | 2/2013 |
| JP | 2005099523 A | * | 4/2005 |
| TW | 200949796 A1 | | 12/2009 |
| TW | 201535945 A | | 9/2015 |

* cited by examiner

POWER SUPPLY MODULE OF DRIVING DEVICE IN DISPLAY SYSTEM, RELATED DRIVING DEVICE AND POWER SUPPLY METHOD

CROSS REFERENCE TO RELATED APPLICATIONS

This application claims the benefit of U.S. Provisional Application No. 62/222,227 filed on Sep. 23, 2015, the contents of which are incorporated herein in their entirety.

BACKGROUND OF THE INVENTION

1. Field of the Invention

The present invention relates to a power supply module of a driving device in a display system, related driving device and power supplying method, and more particularly, to a power supply module providing a data voltage of single polarity at the same time, related driving device and power supplying method.

2. Description of the Prior Art

Nowadays, there are many electronic paper display systems exclusively utilized for reading on the market. The electronic paper is a conducting polymers material comprising lots of microspheres (e.g. microcapsules). The electronic paper have mimic appearance and features of the paper, not only equipping softness but also capable of repeatedly displaying data. Different from a liquid crystal display that needs backlights for displaying images, the electronic paper is able to reflect the external light to display images. Thus, the image displayed by the electronic paper is visible indirect sunlight without appearing to fade. Further, the electronic paper does not have problem of limited viewing angle.

Generally, a driving device (e.g. a driver integrated chip (IC)) of the electronic paper is required to generate scan signals and data signals in large voltage ranges (e.g. the voltage range of the scan signals may be 16V-(−16V) and the voltage range of the data signals may be 11V-(−11V)), to conduct transistors coupled to pixels of the electronic paper and to control the pixels of the electronic paper. The scan signals and the data signals with the large voltage ranges not only increase power consumptions of the driving device, but also make the driving device use a significant number of transistors realized by a process of high withstanding voltage. The manufacture cost is considerably increased, therefore. Thus, how to shrink the voltage ranges of related signals in the driving device becomes a topic to be discussed.

SUMMARY OF THE INVENTION

The present invention relates to a power supply module of a driving device in a display system, related driving device and power supplying method, and more particularly, to a power supply module providing a data voltage of single polarity in the same time, related driving device and power supplying method.

In an aspect, the present invention discloses a power supply module for a driving device of a display system. The power supply module comprises a source power unit, for outputting a source high voltage only in a first period and outputting a source low voltage only in a second period according to a power control signal, wherein the source high voltage and the source low voltage are utilized for generating a plurality of data signals of a plurality of pixels in the display system; and a bias power unit, for generating a common voltage, wherein the common voltage is between the source high voltage and the source low voltage; wherein the first period does not overlap the second period.

In another aspect, the present invention further discloses a driving device for a display system. The driving device comprises a driving module, for utilizing a source high voltage, a source low voltage and display data to generate a plurality of data signals of a plurality of pixels in the display system and utilizing a first common voltage to generate a second common voltage; a control module, for generating the display data according to an input data and generating a power control signal; and a power supply module, comprising a source power unit, for outputting the source high voltage only in a first period and outputting the source low voltage only in a second period according to the power control signal; and a bias power unit, for generating the first common voltage, wherein the common voltage is between the source high voltage and the source low voltage; wherein the first period does not overlap the second period.

In still another aspect, the present invention discloses a power supplying method for driving a power supply module of a driving device in a display system. the power supplying method comprises outputting a source high voltage only in a first period; and outputting a source low voltage only in a second period; wherein the source high voltage and the source low voltage are utilized for generating a plurality of data signals of a plurality of pixels in the display system; wherein the first period does not overlap the second period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
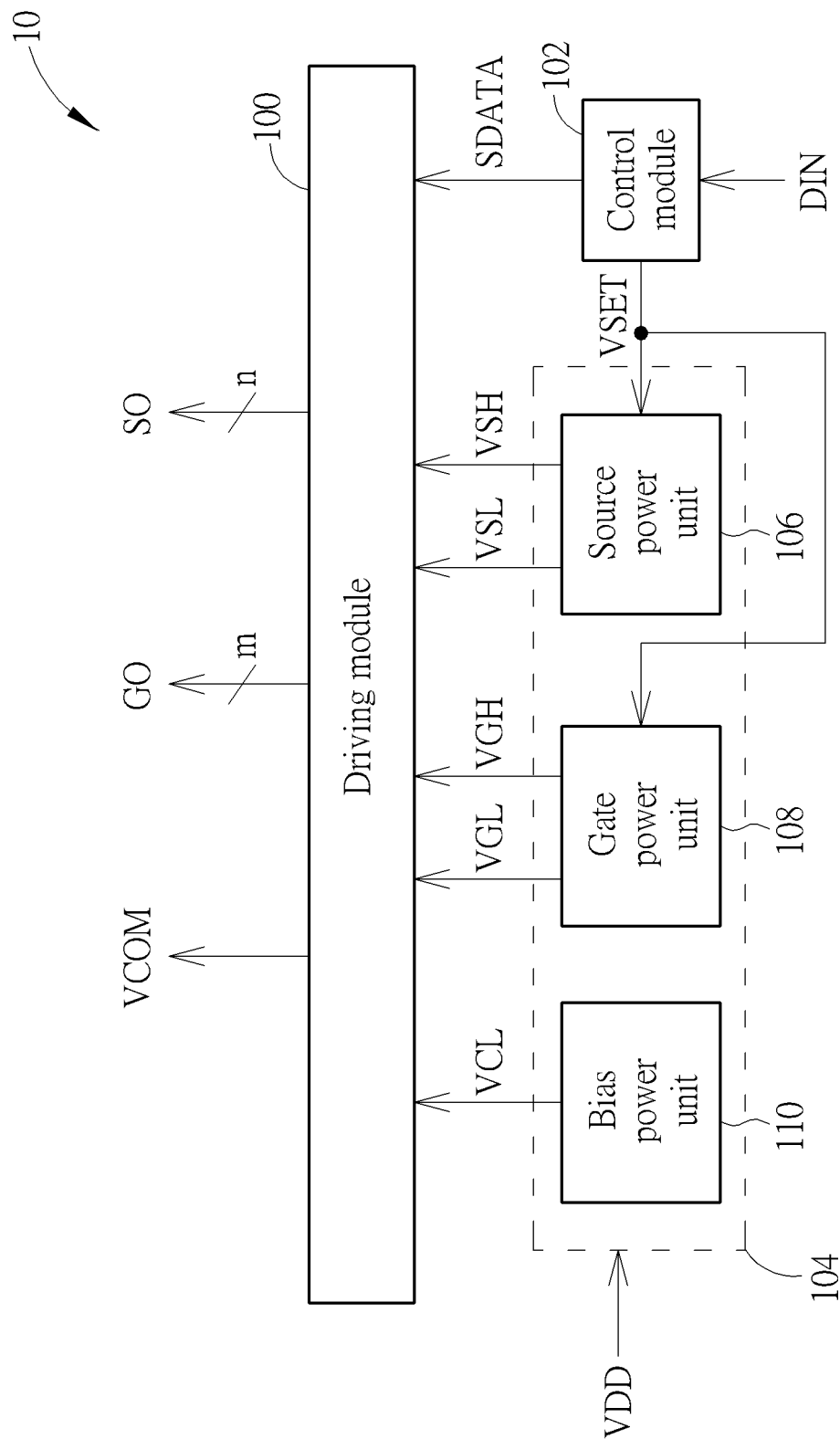
FIG. 1 is a schematic diagram of a driving device according to an example of the present invention.

Please refer to FIG. 1, which is a schematic diagram of a driving device 10 according to an example of the present invention. The driving device 10 may be a driver circuit for driving a display system with a display function, such as a liquid crystal display or an electronic paper, and is not limited herein. As shown in FIG. 1, the driving device 10 comprises a driving module 100, a control module 102 and a power supply module 104. The driving module 100 is utilized to generate m switch signals GO according to a gate high voltage VGH and a gate low voltage VGL to a display system (e.g. an electronic paper or a panel, not shown in FIG. 1), to generate n data signals SO according to a source high voltage VSH, a source low voltage VSL and display data SDATA to the display system, and to use a common voltage VCL to generate a common voltage VCOM to the display system. The switch signals GO are utilized to control a plurality switches coupled to a plurality pixels in the display system and the data signals SO are a plurality data signals of the plurality of pixels. For example, the driving module 100 may comprise a gate driving unit and a source driving unit (not shown in FIG. 1) that respectively generate the switch signals GO and the data signals SO. The control module 102 is utilized to generate the display data SDATA according to input data DIN. The power supply module 104 comprises a source power unit 106, a gate power unit 108 and a bias power unit 100 and uses a system power VDD to generate the gate high voltage VGH, the gate low voltage VGL, the source high voltage VSH, the source low voltage VSL, and the common voltage VCL. According to a power control signal VSET generated by the control module 102, the power supply module 104 outputs only one of the source high voltage VSH and the source low voltage VSL at the same time. Under such a condition, an output voltage range of the power supply module 104 is narrowed, to decrease a power consumption of the power supply module 104.

In an example, the bias power unit 110 outputs the fixed common voltage VCL to the driving module 100 and the driving module 100 uses the common voltage VCL to generate the common voltage VCOM, wherein the common voltages VCOM and VCL are between the source high voltage VSH and the source low voltage VSL. That is, the driving module 100 uses the common voltage VCL as the supply power of the common voltage VCOM. Generally, the common voltage VCOM is smaller than or equal to the common voltage VCL. In order to simplify illustrations, the common voltage VCOM sets to be equal to the common voltage VCL in the following descriptions. The control module 102 controls the source power unit 106, via the power control signal VSET, to output the source high voltage VSH within a period TPP and to output the source low voltage VSL within a period TPN. Note that, the source high voltage VSH is greater than the ground voltage VSS, the source low voltage VSL is smaller than the ground voltage VSS and the period TPP does not overlap the period TPN.

In details, voltage ranges of the switch signals GO (i.e. the voltage range from the gate high voltage VGH to the gate low voltage VGL) cover voltage ranges of the data signals SO. If the source power unit 106 simultaneously outputs the source high voltage VGH and the source low voltage VSL (i.e. the voltage range of the data signals SO is from the source high voltage VSL to the source low voltage VSL), the gate high voltage VGH is required to be greater than the source high voltage VSH and the gate low voltage needs to be smaller than the source low voltage VSL. In comparison, the voltage range of the data signal SO changes to be from the source high voltage VGH to the ground voltage VSS within the period TPP because the source power unit 106 only outputs the source high voltage VSH within the period TPP. Under such a condition, the gate low voltage VGL can be increased to a negative voltage smaller than the ground voltage VSS. Similarly, the voltage range of the data signals SO changes to be from the ground voltage VSS to the source low voltage VSL within the period TPN because the source power unit 106 only outputs the source low voltage VSL within the period TPN. The gate high voltage VGH can be decreased to a positive voltage greater than the ground voltage VSS, therefore. Via alternately outputs the source high voltage VSH and source low voltage VSL, the output voltage ranges of the source power unit 106 and the gate power unit 108 are narrowed and the power consumption of the driving device 10 is reduced. Because the output voltage ranges of the source power unit 106 and the gate power unit 108 are narrowed, the source power unit 106 and the gate power unit 108 can be realized without using transistors of a process of high withstanding voltage. The manufacture cost of the power supply module 104 can be reduced, therefore.

In addition, if the source power unit 106 is realized by a charge pump structure, the source power unit 106 can utilize a flying capacitor (not shown in FIG. 1) to generate the source high voltage VSH within the period TPP and utilize the flying capacitor to generate the source low voltage VSL within the period TPN. In other words, the source power unit 106 is able to use the same flying capacitor to generate the source high voltage VSH and the source low voltage VSL because the source power unit 106 outputs only one of the source high voltage VSH and the source low voltage at the same time. Comparing to the case of source power unit outputting the source high voltage VSH and the source low voltage VSL simultaneously, a capacitor area of the source power unit 106 may be halved. The manufacture cost of the source power unit 106 is further reduced.

Figure 2:
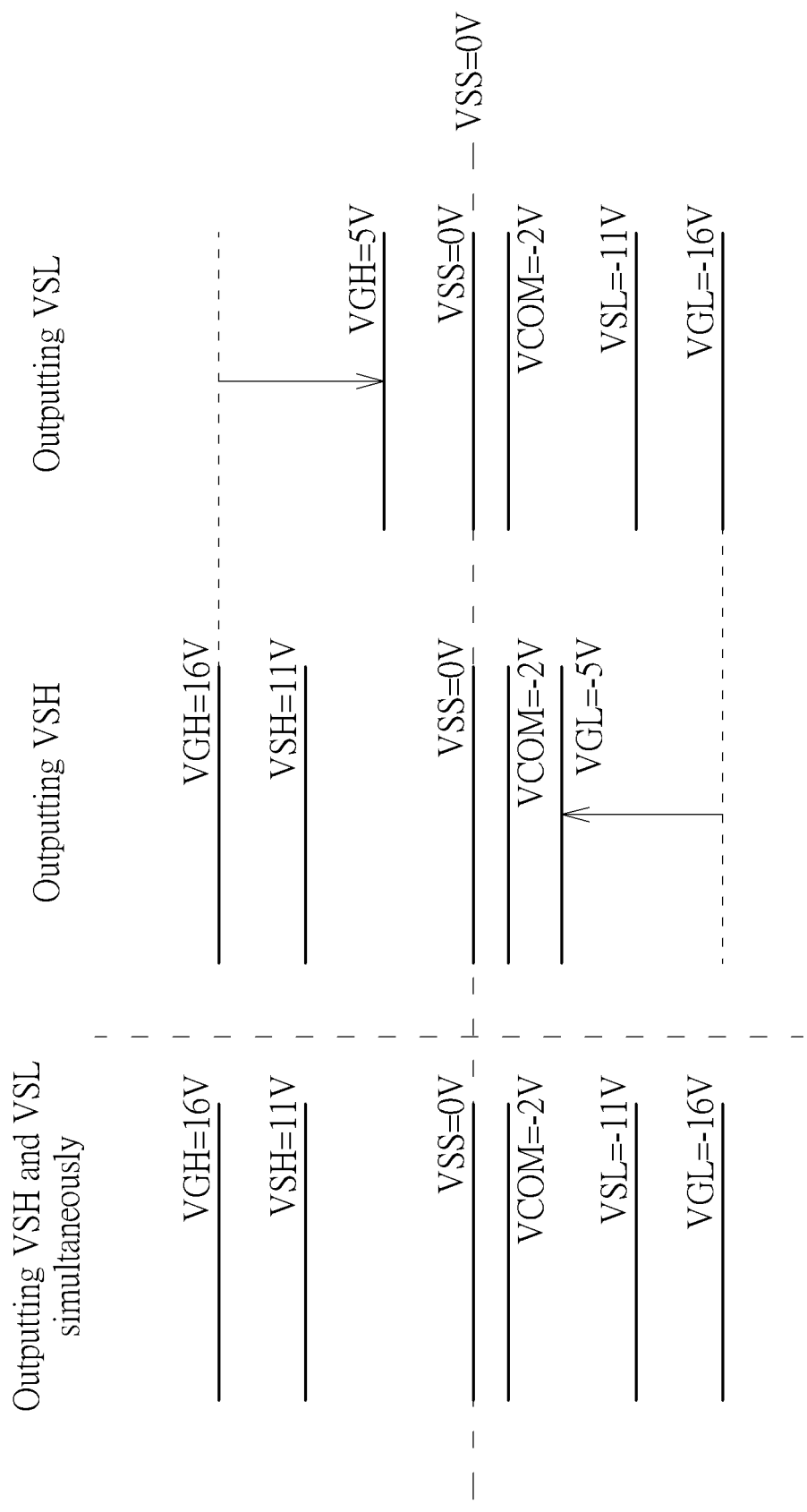
FIG. 2 is a schematic diagram of output voltages of the power supply module shown in FIG. 1.

Please refer to FIG. 2, which is a schematic diagram of output voltages of the power supply module 104 shown in FIG. 1. In FIG. 2, the common voltage VCOM is fixed at −2 volts (V), the source high voltage VSH is 11V, the source low voltage VSL is −11V, and the ground voltage VSS is 0V. As shown in FIG. 2, the gate power unit 108 outputs the gate high voltage VGH greater than the source high voltage VSH (e.g. 16V) and outputs the gate low voltage VGL smaller than the source low voltage VSL (e.g. −16V) when the source power unit 106 simultaneously outputs the source high voltage VSH and the source low voltage VSL. Thus, the voltage range of the gate power unit 108 is 32V and the voltage range of the source power unit 106 is 22V when the source power unit 106 simultaneously outputs the source high voltage VSH and the source low voltage VSL.

In comparison, the voltage range of the source power unit 106 becomes from the source high voltage VSH to the ground voltage VSS (i.e. shrinks to 11V) when the source power unit 106 only generates the source high voltage VSH (i.e. within the period TPP). Under such a condition, the gate low voltage VGL can be increased from −16V to −5V that is smaller than the ground voltage VSS. The voltage range of the gate power unit 108 shrinks from 32V to 21V in this example. Similarly, the voltage range of the source power unit 106 becomes from the ground voltage VSS to the source low voltage VSL when the source power unit 106 only generates the source low voltage VSL (i.e. within the period TPN). Under such a condition, the gate high voltage VGL can be decreased from 16V to 5V that is greater than the ground voltage VSS and the voltage range of the gate power unit 108 shrinks from 32V to 21V. The voltage ranges of the source power unit 106 and the gate power unit 108 are narrowed when the source power unit 106 outputs only one of the source high voltage VSH and the source low voltage VSL at the same time, making the power consumption of the source power unit 106 and the gate power unit 108 decrease. Moreover, the source power unit 106 and the gate power unit 108 do not need to be realized by the process of high withstanding voltage. The manufacture cost of the driving device 10 is reduced, therefore.

In another example, the bias power unit 110 alternately outputs the common voltage VCL of different polarities to the driving module 100 and the driving module 100 outputs the common voltage VCL as the common voltage VCOM. In this example, the driving device 10 uses the common voltage VCL to replace the ground voltage VSS as the reference voltage. Within the period TPP, the bias power unit 110 outputs the negative common voltage VCL and the source power unit 106 outputs the source high voltage VSH. Since the common voltage VCOM is greater than the source low voltage VSL, the gate low voltage VGL can be increased and the voltage range of the gate power unit 108 shrinks. Similarly, the bias power unit 110 outputs the positive common voltage VCL and the source power unit 106 outputs the source low voltage VSL Within the period TPN. Because the common voltage VCOM is smaller than the source high voltage VSH, the gate high voltage VGH can be decreased and the voltage range of the gate power unit 108 shrinks. Via alternately outputting the source high voltage VSH and the source low voltage VSL, the voltage ranges of the source power unit 106 and the gate power unit 108 are narrowed and the power consumption of the driving device 10 is reduced. Furthermore, the source power unit 106 and the gate power unit 108 do not need to be realized by the process of the high withstanding voltage. The manufacture cost of the driving device 10 is reduced, therefore.

Figure 3:
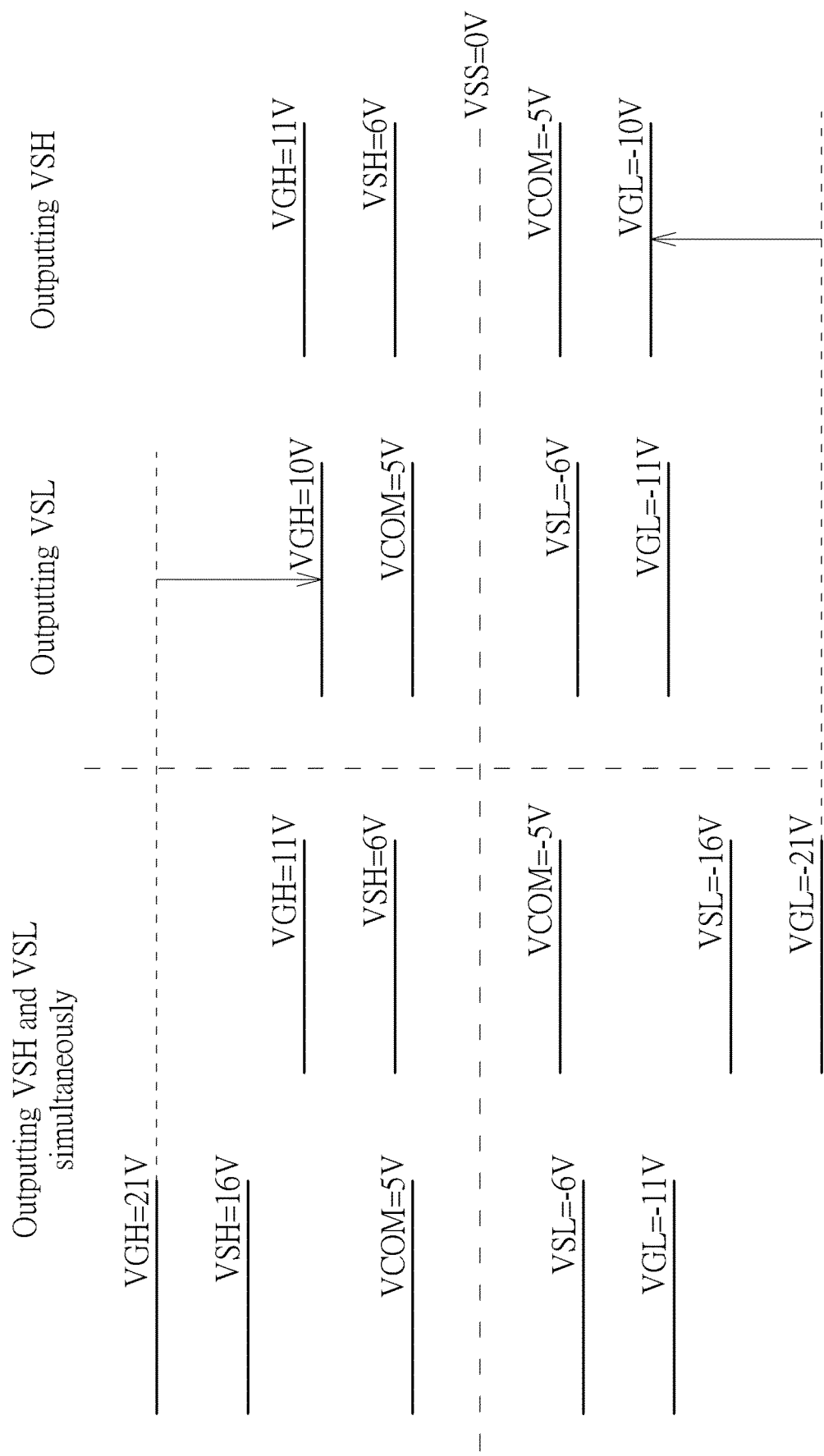
FIG. 3 is a schematic diagram of output voltages of the power supply module shown in FIG. 1.

Please refer to FIG. 3, which is a schematic diagram of output voltages of the power supply module 104 shown in FIG. 1. In FIG. 3, the common voltage VCL (i.e. the common voltage VCOM) outputted by the bias power unit 110 is switched between 5V and −5V. When the source power unit 106 simultaneously outputs the source high voltage VSH and the source low voltage VSL and the common voltage VCOM is 5V, the source high voltage VSH and the source low voltage VSL are 16V and −6V, respectively. The gate high voltage VGH is 21V that is greater than the source high voltage VSH and the gate low voltage VGL is −11V that is smaller than the source low voltage VSL. When the source power unit 106 simultaneously outputs the source high voltage VSH and the source low voltage VSL and the common voltage VCOM is −5V, the source high voltage VSH and the source low voltage VSL are 6V and −16V, respectively. The gate high voltage VGH becomes 11V that is greater than the source high voltage VSH and the gate low voltage VGL becomes −21V that is smaller than the source low voltage VSL. In other words, the voltage range of the source power unit 106 is 22V and the voltage range of the gate power unit 108 is 32V when the source power unit 106 simultaneously generates the source high voltage VSH and the source low voltage VSL.

In comparison, the source power unit 106 of the present disclosure outputs the source low voltage VSL (i.e. within the period TPN) that is −6V when the common voltage VCOM is 5V. Under such a condition, the gate high voltage VGH becomes 10V that is greater than the common voltage VCOM and the gate low voltage VGL is −11V that is smaller than the source low voltage VSL. When the common voltage COM is −5V, the source power unit 106 of the present disclosure outputs the source high voltage VSH (i.e. within the period TPP) that is 6V. At this time, the gate high voltage VGH is 11V that is greater than the source high voltage VSH and the gate low voltage becomes −10V that is smaller than the common voltage VCOM. In other words, the voltage range of the source power unit 106 is narrowed to 11V and the voltage range of the gate power unit 108 decreases to 21V when the source power unit 106 outputs only one of the source high voltage VSH and the source low voltage VSL at the same time. The power consumption of the driving device 10 is effectively reduced, therefore. Further, the driving device 10 can be realized without components of the process of the high withstanding voltage and the source power unit 106 can use the same flying capacitor to generate the source high voltage VSH and the source low voltage VSL. Thus, the manufacture cost of the driving device 10 is reduced.

According to different applications and design concepts, the voltages of the common voltages VCL and VCOM, the gate high voltage VGH, the gate low voltage VGL, the source high voltage VSH and the source low voltage VSL may be appropriately altered and are not limited to the exemplified voltages shown in FIGS. 2 and 3.

In addition, when the data signals are required to reach the source high voltage VSH and the source low voltage VSL in the same phase, the examples of the present disclosure need to output the source high voltage VSH and the source low voltage VSL in different periods (e.g. the periods TPP and TPN) of the same phase because the examples of the present disclosure output only one of the source high voltage VSH and source low voltage VSL at the same time. The data signals therefore can normally adjust display voltages of the pixels.

Figure 4:
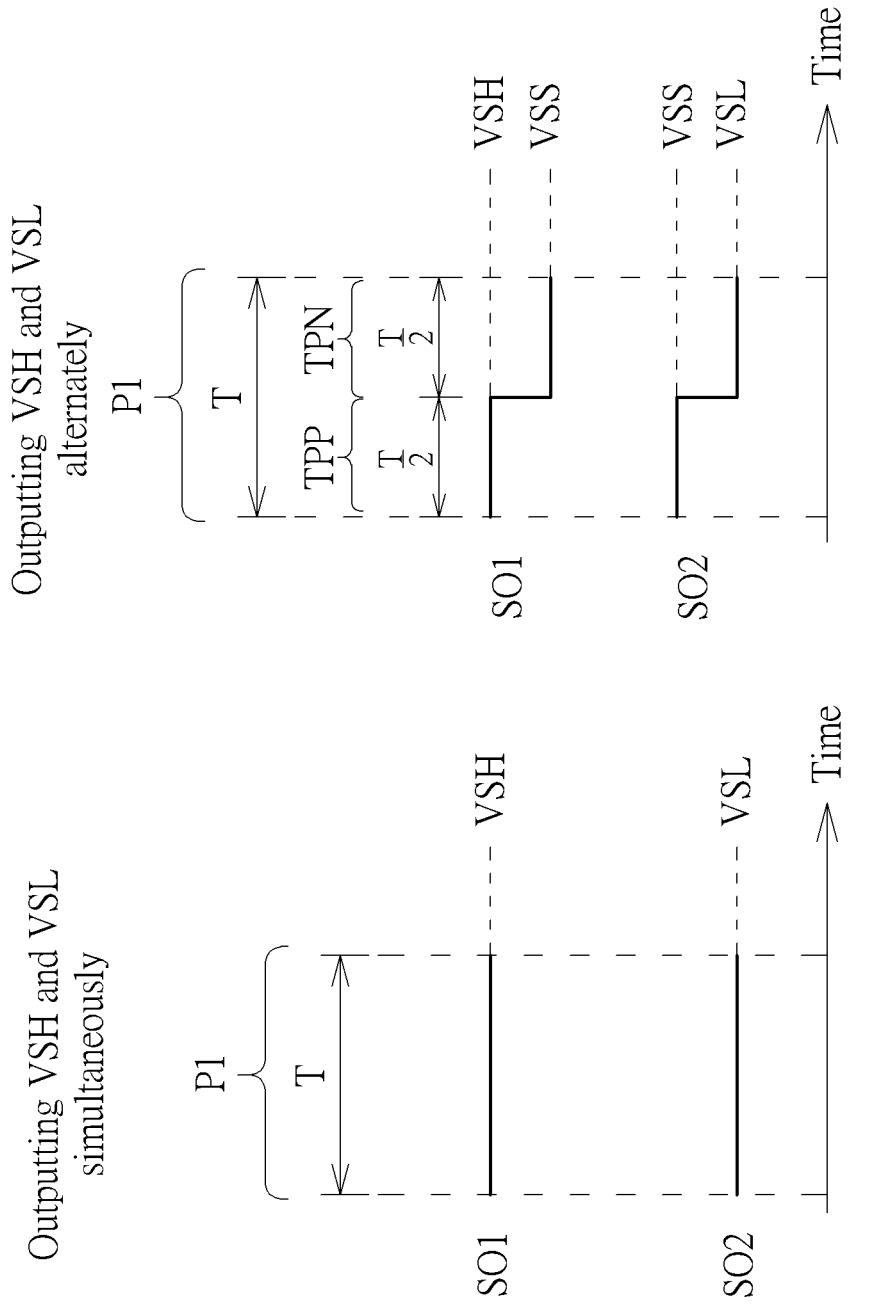
FIG. 4 is a schematic diagram of data signals according to an example of the present invention.

Please refer to FIG. 4, which is a schematic diagram of data signals SO1 and SO2 according to an example of the present invention. The data signals SO1 and SO2 are two of the n data signals SO shown in FIG. 1. In FIG. 4, a target voltage of a pixel PIX1 corresponding to the data signal SO1 is the source high voltage VSH and a target voltage of a pixel PIX2 corresponding to the data signal SO2 is the source low voltage VSL. If the source power unit 106 is able to simultaneously output the source high voltage VSH and the source low voltage VSL, the data signals SO1 and SO2 can be the source high voltage VSH and the source low voltage VSL, respectively, to make the voltage of pixel PIX1 reach the source high voltage VSH and to make the voltage of pixel PIX2 reach the source low voltage VSL. When the source power unit 106 outputs only one of the source high voltage VSH and the source low voltage VSL at the same time, a period P1 whose time is T is divided into the periods TPP and TPN whose periods are T/2 in this example. Within the period TPP, the source power unit 106 outputs the source high voltage VSH. The data signal SO1 is the source high voltage VSH to make the voltage of the pixel PIX1 reach the source high voltage VSH, and the data signal SO2 is the ground voltage VSS to substantially hold the voltage of pixel PIX2. Within the period TPN, the source power unit 106 outputs the source low voltage VSL. The data signal SO1 changes to be the ground voltage VSS to substantially hold the voltage of the pixel PIX1, and the data signal SO2 becomes the source low voltage VSL to make the voltage of the pixel PIX2 reach the source low voltage VSL. As a result, the example shown in FIG. 4 is able to allow the data signals SO1 and SO2 to normally adjust the voltages of pixels when the source high voltage VSH and the source low voltage VSL are alternately outputted.

Note that, the sequence of the periods TPP and TPN may be switched and the time ratio between the periods TPP and TPN may be appropriately altered. Both of the sequence of the periods TPP and TPN and the ratio between the periods TPP and TPN are not limited to those shown in FIG. 4.

Figure 5:
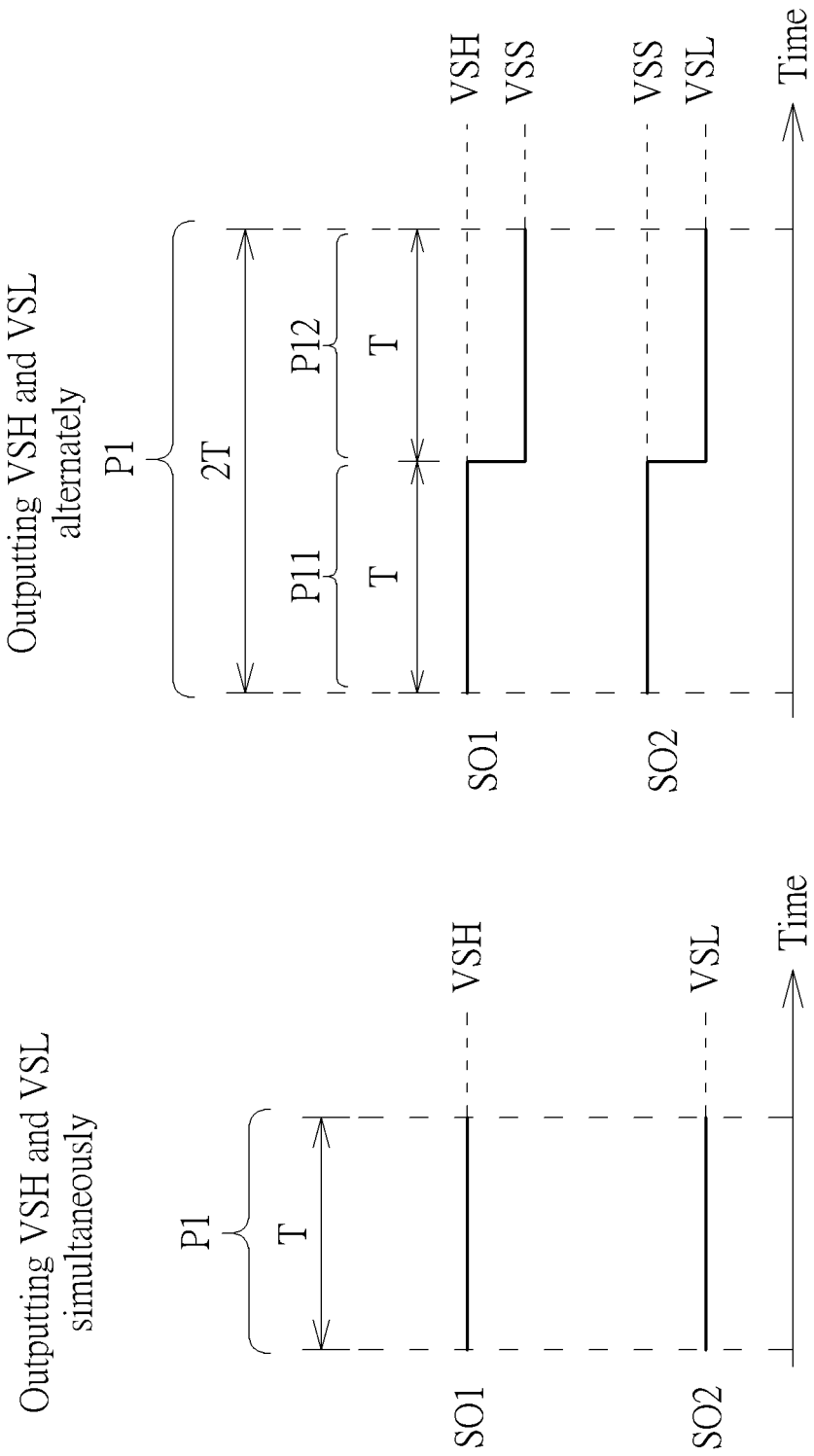
FIG. 5 is a schematic diagram of data signals according to an example of the present invention.

Please refer to FIG. 5, which is a schematic diagram of the data signals SO1 and SO2 according to an example of the present invention, wherein the data signals SO1 and SO2 are two of the n data signals SO. Similar to the example shown in FIG. 4, the target voltage of the pixel PIX1 corresponding to the data signal SO1 is the source high voltage VSH and the target voltage of the pixel PIX2 corresponding to the data signal SO2 is the source low voltage VSL within the phase P1. If the source power unit 106 is able to simultaneously output the source high voltage VSH and the source low voltage VSL, the data signals SO1 and SO2 can be the source high voltage VSH and the source low voltage VSL, respectively, to make the voltage of pixel PIX1 reach the source high voltage VSH and to make the voltage of pixel PIX2 reach the source low voltage VSL. In this example, the time of the phase P1 is extended twice and the phase P1 is equally divided into phases P11 and P12 whose times are T. Within the phase P11, the source power unit 106 outputs the source high voltage VSH. The data signal SO1 is the source high voltage VSH to make the voltage of the pixel PIX1 reach the source high voltage VSH and the voltage the data signal SO2 is the ground voltage VSS to substantially hold the voltage of the pixel PIX2. Within the phase P12, the source power unit 106 outputs the source low voltage VSL. The data signal SO1 changes to the ground voltage VSS to substantially hold the voltage of the pixel PIX1 and the data signal SO2 becomes the source low voltage VSL to make the voltage of the pixel PIX2 reach the source low voltage VSL. Via extending the phase P1 to the phases P11 and P12 and providing the source high voltage VSH and the source low voltage VSL respectively in the phases P11 and P12, the voltages of the pixels PIX1 and PIX2 is ensured to reach their own target voltages.

In an example, the control module 102 determines whether the n data signals SO have different polarities within the same phase (e.g. whether voltages of the n data signals SO respectively are the source high voltage VSH and the source low voltage VSL within the same phase) according to the input data DIN. When determining the n data signals SO have different polarities within the same phase, the control module 102 may divide the phase into the periods TPP and TPN (e.g. FIG. 4) or extend the phase (e.g. FIG. 5), to make the data signals SO reach the source high voltage VSH and the source low voltage VSL at different times.

Figure 6A:
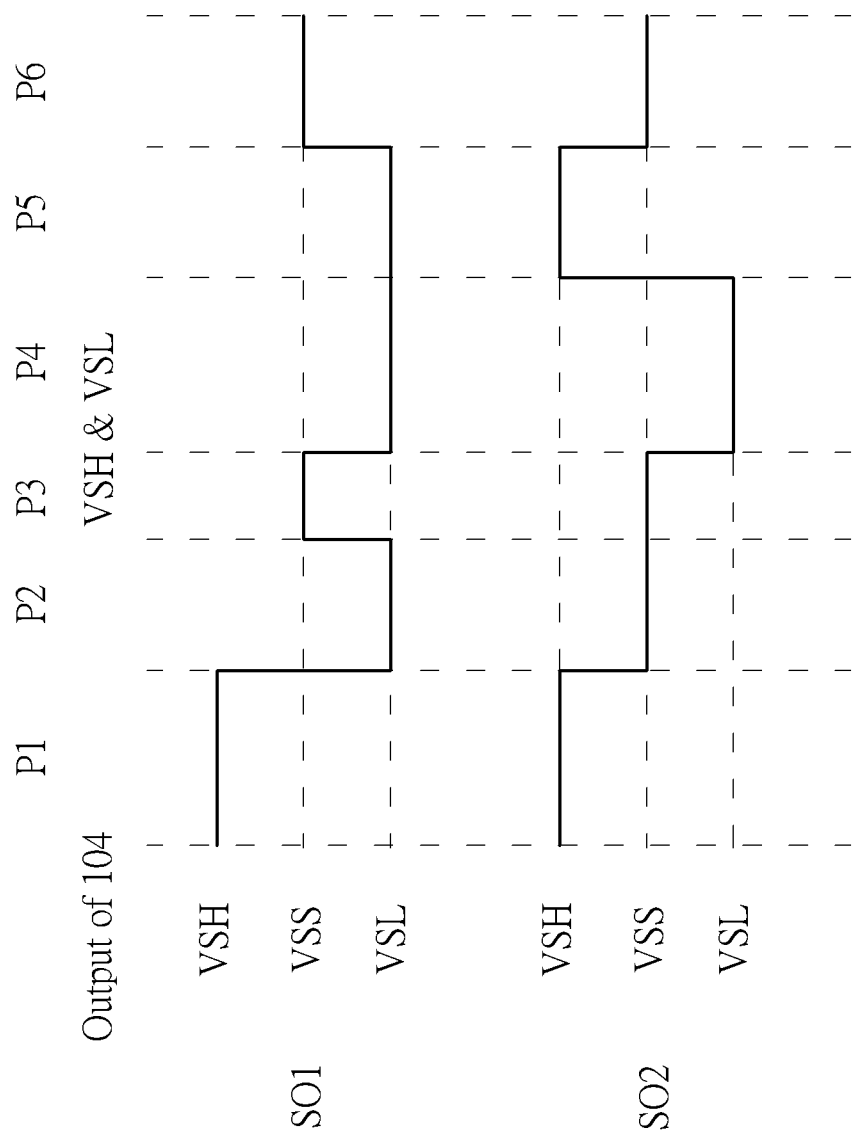
FIGS. 6A and 6B are schematic diagrams of data signals.
Figure 6B:
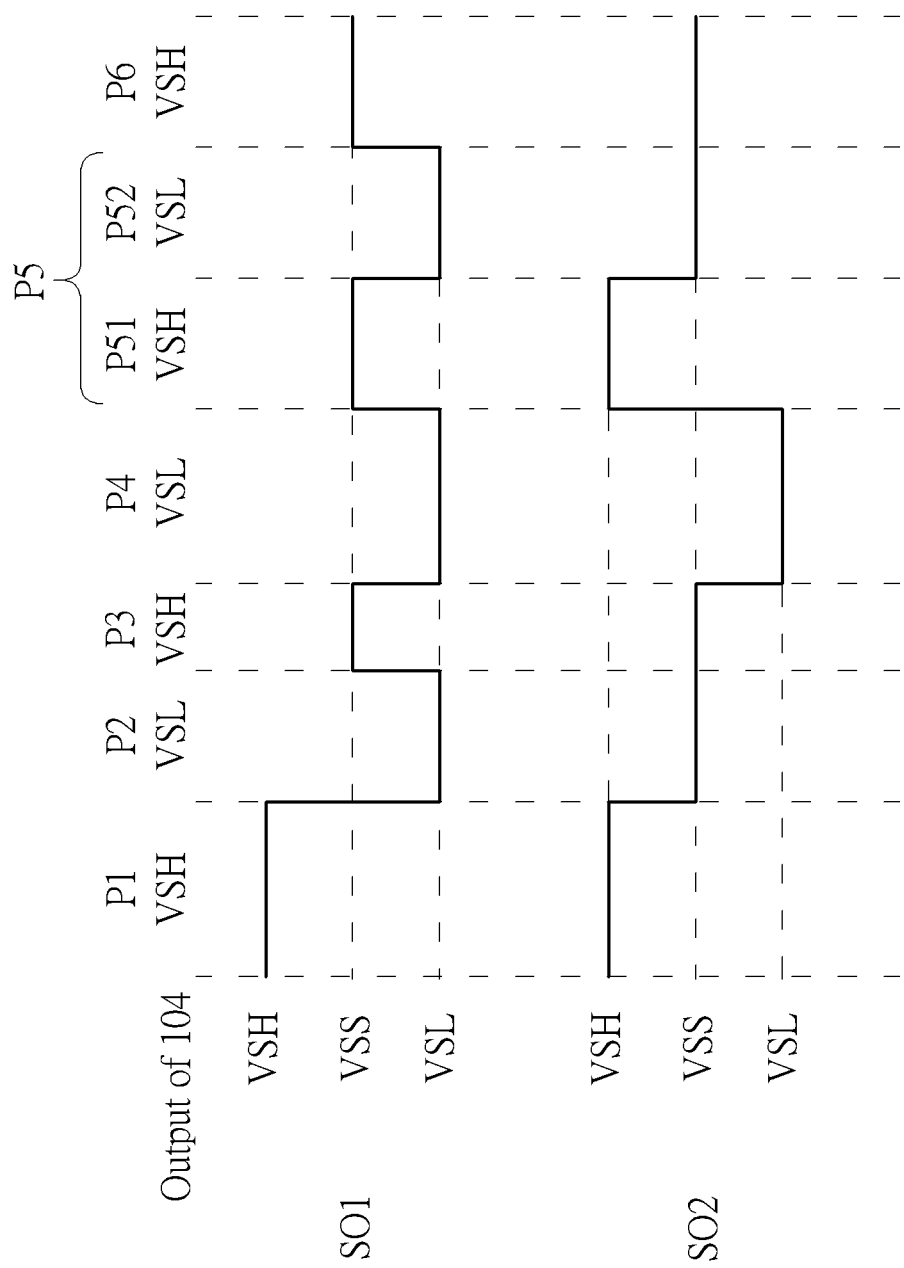

Please refer to FIGS. 6A and 6B, which are schematic diagrams of the data signals SO1 and SO2. The data signals SO1 and SO2 are two of the n data signals SO and the rest of the n data signals SO equal to one of the data signals SO1 and SO2. In FIG. 6A, the driving device 10 adopts a conventional source power unit capable of outputting the source high voltage VSH and the source low voltage VSL simultaneously. Because the driving module 100 is able to simultaneously use the source high voltage VSH and the source low voltage VSL to generate the data signals SO1 and SO2, the driving module 100 does not need to adjust waveforms of the data signals SO1 and SO2 according the polarity difference between the data signals SO1 and SO2. For example, the driving module 100 within the phase P5 can simultaneously use the source high voltage VSH and the source low voltage VSL to generate the data signal SO1 whose voltage is the source high voltage VSH and the data signal SO2 whose voltage is the source low voltage VSL.

In FIG. 6B, the driving device 10 adopts the source power unit 106 that outputs only one of the source high voltage VSH and the source low voltage VSL at the same time. Since the driving module 100 can use only one of the source high voltage VSH and the source low voltage VSL to generate the data signals SO1 and SO2 at the same time, the driving module 100 needs to adjust the waveforms of the data signals SO1 and SO2 according to the polarity difference between the data signals SO1 and SO2. Within the phase P1, the control module 102 determines that both the voltages of the data signals SO1 and SO2 are the source high voltage VSH (i.e. the polarity of the data signals SO1 and SO2 are the same) and accordingly controls the source power unit 106 to output the source high voltage VSH. Within the phase P2, the voltage of the data signal SO1 is the source low voltage VSL and the voltage of the data signal SO2 is the ground voltage VSS. The control module 102 determines that the polarities of the data signals SO1 and SO2 are not different and accordingly controls the source power unit 106 outputs the source low voltage VSL. Within the phase P3, the voltages of the data signals SO1 and SO2 are the ground voltage VSS. The control module 102 determines that the polarities of the data signals SO1 and SO2 are not different and accordingly controls the source power unit 106 outputs the source high voltage VSH. Note that, the control module 102 also can control the source power unit 106 to output the source low voltage VSL within the phase P3.

Next, the voltages of the data signals SO1 and SO2 are the source low voltage VSL within the phase P4. The control module 102 determines that the polarities of the data signals SO1 and SO2 are the same and accordingly controls the source power unit 106 outputs the source low voltage VSL. Because determining the polarities of the data signals SO1 and SO2 are different within the phase P5, the control module 102 extends the phase P5 to the phases P51 and P52. Within the phase P51, the source power unit 106 outputs the source high voltage VSH, the voltage of the data signal SO1 is the ground voltage VSS and the voltage of the data signal SO2 reaches the source high voltage VSH. Within the phase P52, the source power unit 106 outputs the source low voltage VSL, the voltage of the data signal SO1 becomes the source low voltage VSL and the voltage of the data signal SO2 changes to the ground voltage VSS. Within the phase P6, the voltages of the data signals SO1 and SO2 are the ground voltage VSS. The control module 102 determines that the polarities of the data signals SO1 and SO2 are not different and accordingly controls the source power unit 106 outputs the source high voltage VSH.

As can be seen from FIG. 6B, the control module 102 extends the phase P5 to the phases P51 and P51, outputs the source high voltage VSH within the phase P51 and outputs the source low voltage VSL within the phase P52 when determining the polarities of the data signals SO1 and SO2 are different within the phase P5. As a result, the driving device 10 still can normally operate to drive the display system even if the source power unit 106 outputs only one of the source high voltage VSH and the source low voltage VSL at the same time.

Figure 7:
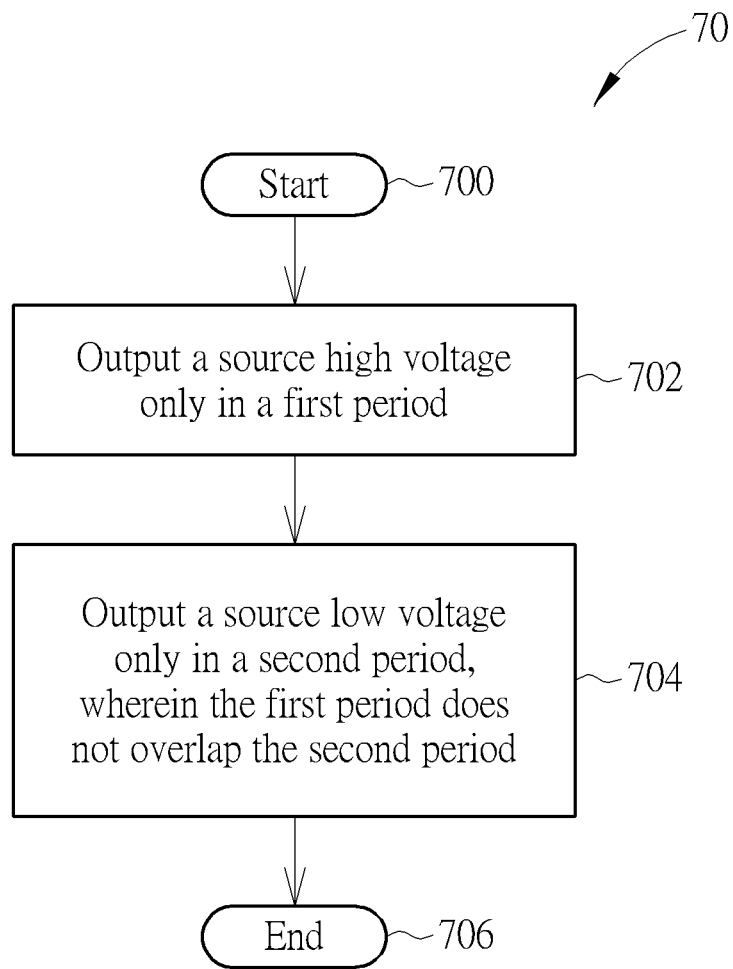
FIG. 7 is a flowchart of a power supplying method according to an example of the present invention.

The process of the power supply module 104 providing the source high voltage VSH and the source low voltage VSL can be summarized in to a power supplying method 70 shown in FIG. 7. The power supplying method 70 may be utilized in a power supply module of a driving device for driving a display system (e.g. an electronic paper) and comprises the following steps:

Step 700: Start.
Step 702: Output a source high voltage only in a first period.
Step 704: Output a source low voltage only in a second period, wherein the first period does not overlap the second period.
Step 706: End.

According to the power supply method 70, the power supply module outputs a source high voltage only in a first period and outputs a source low voltage only in a second period. The source high voltage and the source low voltage are utilized to generate a plurality of data signals of a plurality of pixels in the display system. Note that, the first period does not overlap the second period. That is, the power supply module outputs only one of the source high voltage and the second low voltage for generating the data signals at the same time. Under such a condition, an output voltage range of the power supply module is decreased, making a power consumption and a manufacture cost of the power supply module reduced. In addition, the power supply module is able to use the same flying capacitor to generate the source high voltage and the source low voltage. The manufacture cost of the power supply module is further reduced.

In an example, the power supply module outputs a fixed common voltage, a gate high voltage and a gate low voltage. The common voltage is between the source high voltage and the source low voltage, and the gate high voltage and the gate low voltage are utilized to generate switch signals controlling a plurality of switches coupled to the plurality of pixels. When alternately outputting the source high voltage and the source low voltage, the power supply module accordingly adjusts the gate high voltage and the gate low voltage. When switching from the second period to the first period, the power supply module switches from outputting the source low voltage to outputting the source high voltage. At this moment, the power supply module increases the gate high voltage and the gate low voltage. When switching from the first period to the second period, the power supply module stops outputting the source high voltage and starts outputting the source low voltage. At this moment, the power supply module decreases the gate high voltage and the gate low voltage.

In another example, the power supply module outputs a time variable common voltage that is between the source high voltage and the source low voltage. When the power supply module outputs the source high voltage in the first period, the power supply module adjusts the common voltage to a negative voltage; and when the power supply module outputs the source low voltage in the second period, the power supply module adjusts the common voltage to a positive voltage.

In still another example, the power supply module determines whether alternately outputs the source high voltage and the source low voltage according to whether the plurality of data signals have different polarities at the same time (e.g. in the same phase). If the plurality of data signals have the same polarity in a phase, the power supply module outputs one of the source high voltage and the source low voltage whose polarity is equal to those of the plurality of data signals. If the plurality of data signals have different polarities in a phase, the power supply module outputs the source high voltage within a period of the phase and outputs the source low voltage within another period of the phase.

Figure 8:
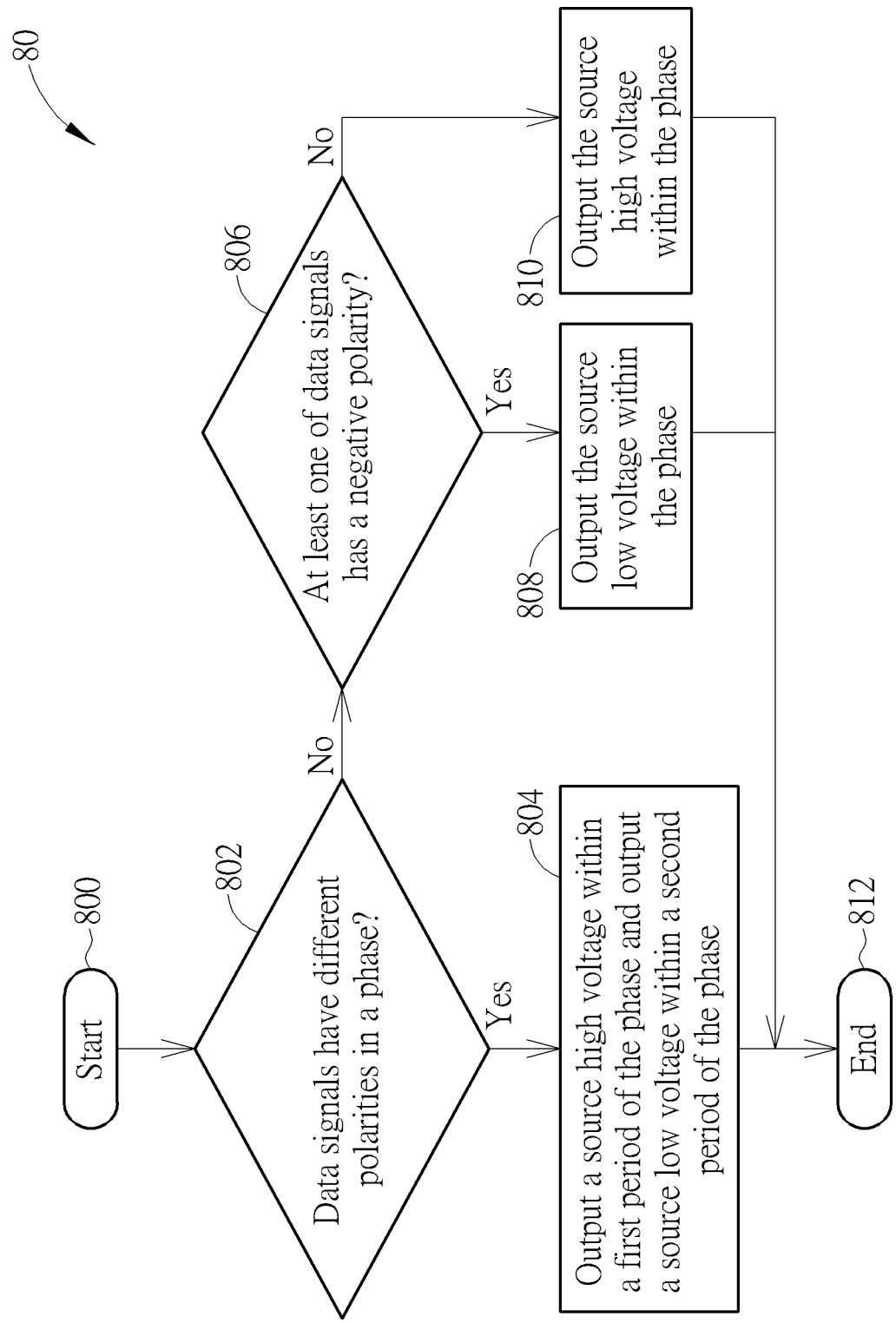
FIG. 8 is a flowchart of a power supplying method according to an example of the present invention.

Please refer to FIG. 8, which is a flowchart of a power supply method 80 according to an example of the present invention. The power supply method 80 may be utilized in a power supply module in a driving device for driving a display system (e.g. an electronic paper) and comprises the following steps:

Step 800: Start.
Step 802: Determine whether a plurality of data signals for driving a plurality of pixels of the display system have different polarities in a phase. If yes, perform step 804; otherwise, perform step 806.
Step 804: Output a source high voltage within a first period of the phase and output a source low voltage within a second period of the phase.
Step 806: Determine whether at least one of the plurality data signals has a negative polarity. If yes, perform step 808; otherwise, perform step 810.
Step 808: Output the source low voltage within the phase.
Step 810: Output the source high voltage within the phase.
Step 812: End.

According to the power supply method 80, the power supply module determines whether a plurality of data signal that are utilized for driving a plurality of pixels of the display system have different polarities in a phase. If the plurality of data signals have different polarities, the power supply module outputs a source high voltage to the driving device within a first period of the phase and outputs a source low voltage to the driving device within a second period of the phase. The driving device therefore can use the source high voltage to generate the data signals with the positive polarity within the first period and use the source low voltage to generate the data signals with the negative polarity within the second period. Note that, the time lengths of the first period and the second period may be altered according to different applications and design concepts. If the plurality of data signals do not have different polarities, the power supply module determines whether at least one of the plurality of data signals has the negative polarity. When at least one of the plurality of data signals has the negative polarity, the power supply module outputs the source low voltage to the driving device in the phase and the driving device uses the source low voltage to generate the plurality of data signals. When none of the plurality of data signals has the negative polarity, the power supply module outputs the source high voltage to the driving device in the phase and the driving device uses the source high voltage to generate the plurality of data signals. As a result, the power supply module outputs only one of the source high voltage and the source low voltage, to narrow an output voltage range of the power supply module and to reduce the power consumption of the power supply module. Further, a number of the components realized by the process of high withstanding process in the power supply module is decreased and the power supply module can use the same flying capacitor to generate the source high voltage and the source low voltage. The manufacture cost of the power supply module is therefore reduced.

As to detailed operation processes of the power supply method 80, please refer to FIG. 6B. In the example shown in FIG. 6B, each of the plurality of data signals equals one of the data signals SO1 and SO2. Within the phases P1, P3, and P6, the power supply module performs steps 802, 806, and 810 because the polarities of the data signals SO1 and SO2 are not different and are not negative, to output the source high voltage VSH to the driving device. Within the phases P2 and P4, the power supply module performs the steps 802, 806, and 808 since the polarities of the data signals SO1 and SO2 are not different and at least one of the polarities of the data signals SO1 and SO2 is negative, to output the source low voltage VSL to the driving device. Within the phase P5, the power supply module performs steps 802 and 804 because the polarities of the data signals SO1 and SO2 are different, to output the source high voltage VSH in the phase P51 (i.e. the first period) and to output the source low voltage VSL in the phase P52 (i.e. the second period). Under such a condition, the driving device can use the source high voltage VSH to generate the data signals with the same waveform of the data signal SO2 within the phase P51 and use the source low voltage VSL to generate the data signals with the same waveform of the data signal SO1 within the phase P52.

Via alternately outputting the source high voltage and the source low voltage utilized for generating the data signals, the power supply modules of the above examples narrows the output voltage range and decrease the power consumption of their own. In addition, the number of the components realized by the process of high withstanding process in the power supply module is decreased and the power supply module is able to use the same flying capacitor to generate the source high voltage and the source low voltage. The manufacture cost of the power supply module is therefore reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply circuit for a driving device of a display system, comprising,
   a source power driver circuit, outputting a source high voltage only in a first period within a phase and outputting a source low voltage only in a second period within the phase according to a power control signal, wherein the source high voltage and the source low voltage are utilized for generating a plurality of data signals of a plurality of pixels in the display system; and
   a bias power driver circuit, generating a common voltage, wherein the common voltage is between the source high voltage and the source low voltage;
   wherein a voltage of a first data signal of the plurality of data signals is required to reach the source high voltage in the first period within the phase, and a voltage of a second data signal of the plurality of data signals is required to reach the source low voltage in the second period within the phase;
   wherein the voltage of the second data signal is greater than the source low voltage and smaller than the source high voltage in the first period, and the voltage of the first data signal is greater than the source low voltage and smaller than the source high voltage in the second period;
   wherein the first period does not overlap the second period in the phase.

2. The power supply circuit of claim 1, wherein the common voltage is constant and the power supply circuit further comprises:
   a gate power driver circuit, adjusting a gate high voltage and a gate low voltage according to the power control signal, wherein the gate high voltage and the gate low voltage are utilized to generate a plurality of switch signals for controlling a plurality of switches coupled to the plurality of pixels.

3. The power supply circuit of claim 2, wherein the gate low voltage in the first period is greater than the gate low voltage in the second period.

4. The power supply circuit of claim 2, wherein the gate high voltage in the second period is smaller than the gate high voltage in the first period.

5. The power supply circuit of claim 1, wherein the common voltage is a negative voltage in the first period.

6. The power supply circuit of claim 1, wherein the common voltage is a positive voltage in the second period.

7. The power supply circuit of claim 1, further comprising:
   a capacitor unit;
   wherein the source power driver circuit utilizes the capacitor unit to generate the source high voltage in the first period and to generate the source low voltage in the second period.

8. A driving device for a display system, comprising:
   a driving circuit, utilizing a source high voltage, a source low voltage and display data to generate a plurality of data signals of a plurality of pixels in the display system;
   a control circuit, generating the display data according to an input data and generating a power control signal; and
   a power supply circuit, comprising:
      a source power driver circuit, outputting the source high voltage only in a first period within a phase and outputting the source low voltage only in a second period within the phase according to the power control signal; and
      a bias power driver circuit, generating the first a common voltage, wherein the common voltage is between the source high voltage and the source low voltage;
   wherein a voltage of a first data signal of the plurality of data signals is required to reach the source high voltage in the first period within the phase, and a voltage of a second data signal of the plurality of data signals is required to reach the source low voltage in the second period within the phase;
   wherein the voltage of the second data signal is greater than the source low voltage and smaller than the source high voltage in the first period, and the voltage of the first data signal is greater than the source low voltage and smaller than the source high voltage in the second period;
   wherein the first period does not overlap the second period in the phase.

9. A power supplying method for a power supply circuit of a driving device in a display system, the power supplying method comprising:
   outputting a source high voltage only in a first period within a phase; and
   outputting a source low voltage only in a second period within the phase;
   wherein the source high voltage and the source low voltage are utilized for generating a plurality of data signals of a plurality of pixels in the display system;
   wherein a voltage of a first data signal of the plurality of data signals is required to reach the source high voltage in the first period within the phase, and a voltage of a second data signal of the plurality of data signals is required to reach the source low voltage in the second period within the phase;
   wherein the voltage of the second data signal is greater than the source low voltage and smaller than the source high voltage in the first period, and the voltage of the first data signal is greater than the source low voltage and smaller than the source high voltage in the second period;
   wherein the first period does not overlap the second period in the phase.

* * * * *